United States Patent
Alberts et al.

(10) Patent No.: US 12,352,242 B2
(45) Date of Patent: Jul. 8, 2025

(54) DETERMINING TOWER TO TIP CLEARANCE FOR A WIND TURBINE

(71) Applicant: Siemens Gamesa Renewable Energy A/S, Brande (DK)

(72) Inventors: Johannes Gerhardes Alberts, Brøndby Strand (DK); Bjarne Skovmose Kallesøe, Bagsværd (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/276,418

(22) PCT Filed: Jan. 20, 2022

(86) PCT No.: PCT/EP2022/051268
§ 371 (c)(1),
(2) Date: Aug. 8, 2023

(87) PCT Pub. No.: WO2022/175017
PCT Pub. Date: Aug. 25, 2022

(65) Prior Publication Data
US 2024/0110546 A1    Apr. 4, 2024

(30) Foreign Application Priority Data
Feb. 19, 2021    (EP) .................. 21158131.9

(51) Int. Cl.
*F03D 7/02*    (2006.01)

(52) U.S. Cl.
CPC ........ *F03D 7/0288* (2013.01); *F05B 2270/17* (2013.01); *F05B 2270/33* (2013.01); *F05B 2270/802* (2013.01); *F05B 2270/808* (2013.01)

(58) Field of Classification Search
CPC .... F03D 17/00; F03D 17/012; F03D 17/0288; F05B 2270/17; F05B 2270/033;
(Continued)

(56) References Cited

U.S. PATENT DOCUMENTS 9,347,435 B2 *  5/2016  Olesen .................. F03D 7/0288
11,506,175 B2 * 11/2022 Bertolotti .............. F03D 1/0633
(Continued)

FOREIGN PATENT DOCUMENTS

EP    4325048 A1 *  2/2024  ............ F03D 17/011
EP    4365444 A1 *  5/2024  ............ F03D 17/022
(Continued)

OTHER PUBLICATIONS

Cooper, R. et al. ME 3263—Laboratory #2. Introduction to Sensors and Data Analysis. Accessed from https://cooperrc.github.io/sensors_and_data/ME3263-Lab_02/ME3263-Lab_02.html (Year: 2020).*
(Continued)

*Primary Examiner* — Topaz L. Elliott
(74) *Attorney, Agent, or Firm* — Schmeiser, Olsen & Watts, LLP

(57) ABSTRACT

A method of determining a distance between a rotor blade tip and a tower of a wind turbine includes: estimating the distance based on a strain measurement; measuring the distance; correcting an estimation procedure based on the estimated distance and the measured distance; and deriving a corrected distance based on the corrected estimation procedure.

13 Claims, 3 Drawing Sheets

Figure 1:
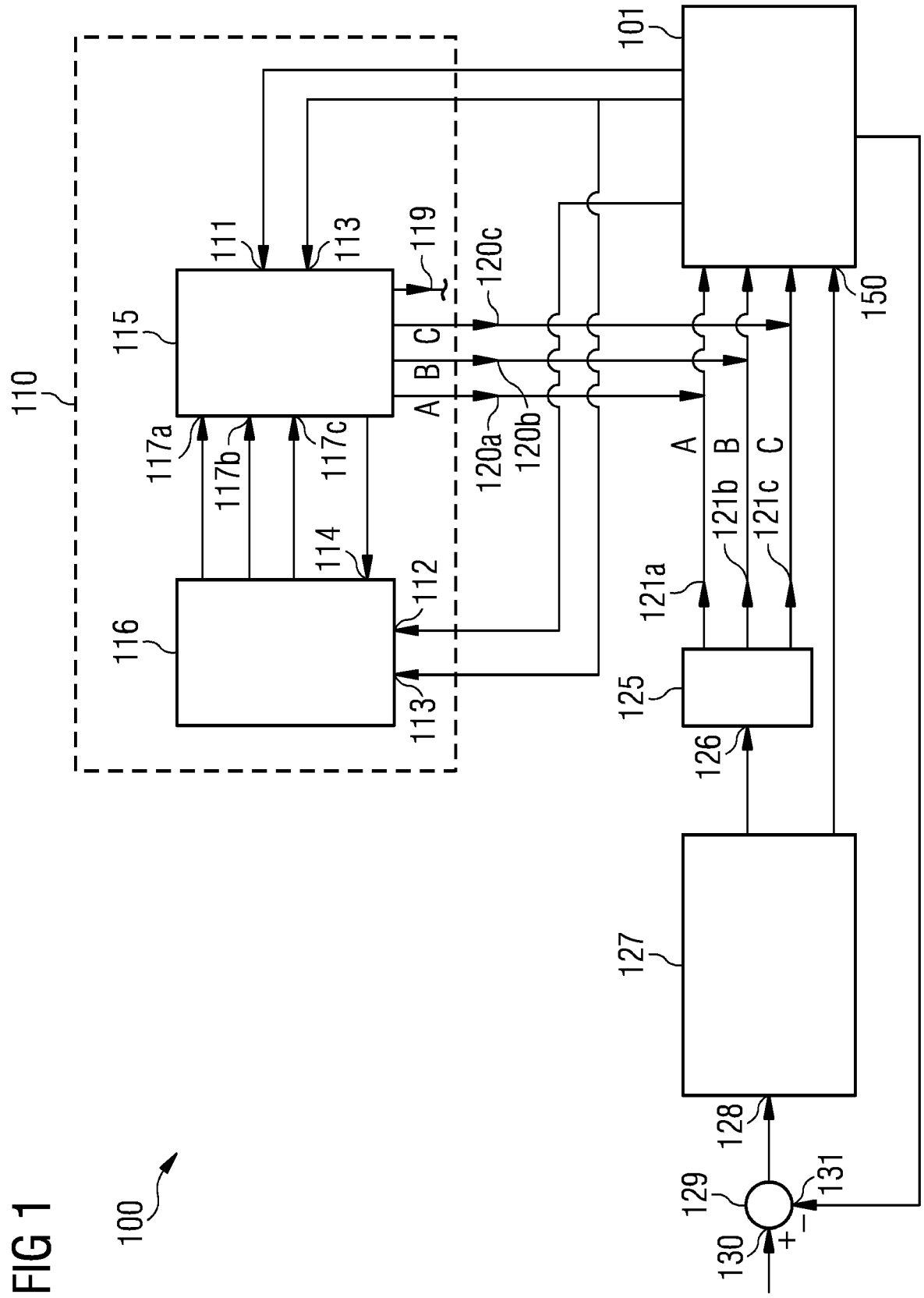

(58) Field of Classification Search
CPC .... G01M 5/00; G01M 5/0016; G01M 5/0025; G01M 5/0041–0058
See application file for complete search history.

(56) References Cited

U.S. PATENT DOCUMENTS

| | | |
|---|---|---|
| 2004/0057828 A1 | 3/2004 | Bosche |
| 2013/0287567 A1* | 10/2013 | Olesen .................. F03D 7/0288 416/61 |
| 2017/0284376 A1* | 10/2017 | Buchtala ............. G01M 5/0033 |
| 2017/0350785 A1* | 12/2017 | Greaves .............. G01M 5/0025 |
| 2020/0309092 A1* | 10/2020 | Bertolotti .............. F03D 1/0633 |

FOREIGN PATENT DOCUMENTS

| | | |
|---|---|---|
| WO | 2019110624 A1 | 6/2019 |
| WO | 2019200526 A1 | 10/2019 |

OTHER PUBLICATIONS

PCT International Search Report and Written Opinion of International Searching Authority mailed May 19, 2022 corresponding to PCT International Application No. PCT/EP2022/051268 filed Jan. 20, 2022.

* cited by examiner

DETERMINING TOWER TO TIP CLEARANCE FOR A WIND TURBINE

CROSS-REFERENCE TO RELATED APPLICATIONS

This application claims priority to PCT Application No. PCT/EP2022/051268, having a filing date of Jan. 20, 2022, which claims priority to EP Application No. 21158131.9, having a filing date of Feb. 19, 2021, the entire contents both of which are hereby incorporated by reference.

FIELD OF TECHNOLOGY

The following relates to a method and to an arrangement of determining a distance between a rotor blade tip and a tower of a wind turbine and further relates to a wind turbine.

BACKGROUND

During operation of a wind turbine, rotor blades mounted at a rotor of a horizontally oriented rotor rotate in a rotor plane which may approach a portion of the wind turbine tower for particular operational conditions, such as high wind speed which may lead to a significant deformation of the rotor blades. In order to ensure that the rotor blades do not touch or collide with portions of the wind turbine tower due to deformation, the rotor blades may be manufactured and designed of a sufficient strength or robustness or stiffness.

In general, blade structural design may be driven by ultimate capacity, fatigue capacity and stiffness constraints to meet the requirements of blade tip to tower clearance (distance). Conventionally, blade tip to tower clearance requirements may be set to relative conservative values in order to reduce risk of collision. If any of the aforementioned constraints are relaxed, it may lead to a lighter blade design which then would lead to a longer blade and/or cheaper blade. Conventionally, a stiffness constant of the rotor blade may be a most dominating parameter for the rotor blade design which has led to the introduction of expensive carbon material. Recently, increasingly larger tower diameters have been employed in wind turbines. Similar to increasing the blade flexibility, an increase in the tower diameter may reduce the distance between the blade tip to the portion of the tower. This reduces the maximum allowed tower diameter, which leads to an increase in steel used to achieve the same fatigue load property and extreme load properties. This may increase foundation and tower costs.

Ensuring a sufficient rotor blade tip to tower clearance or distance may be achieved by either reducing the flexibility of the blade or provide control functionality which controls the wind turbines such that the minimum tip to tower distance is not violated.

The blade may for example be stiffened by introduction of carbon into the blade beams or other blade portions. Furthermore, a conventional measure is to limit a tower diameter however leading to a complex and heavy tower and flange design.

A controller may utilize measurement signals from blade root strain sensors which may estimate the blade deflection in front of the tower using a Coleman transformation. When the bending is estimated to be high and the blade is approaching the tower, it may pitch out that particular blades to offload it and thereby reducing the bending moment, in turn increasing the clearance, i.e., the distance between the blade tip and the tower. However, the additional pitching may have disadvantages regarding the lifetime of the pitch bearing.

Thus, there may be a need for a method and a corresponding arrangement of determining a distance between a rotor blade tip and a tower of a wind turbine, which provide reliable results, and/or improved performance and/or reduces pitch bearing load and/or requires less complexity of a measuring system.

SUMMARY

According to an embodiment of the present invention it is provided a method of determining a distance between a rotor blade tip and a tower of a wind turbine, the method comprising estimating the distance based on a strain measurement; measuring the distance; correcting an estimation procedure based on the estimated distance and the measured distance; and deriving a corrected distance based on the corrected estimation procedure.

The method may be performed for example by a module of a wind turbine controller. The method may be implemented in software and/or hardware. In particular, the method may be performed during normal operation of the wind turbine while the wind turbine produces electrical energy and supplies the energy to a utility grid.

The distance may relate to a distance between a top portion or an end portion of the rotor blade and a portion of the tower, when the rotor blade top portion passes the portion of the tower. The portion of the tower may be an area or location at the tower to which the rotor blade has a smallest distance during operation, when the rotor blade passes the tower portion. In particular, embodiments of the present invention may determine as the distance that distance when the rotor blade points exactly downwards in a vertical direction. The distance between the rotor blade tip and the tower may also be referred to as blade tip to tower clearance (BTTC).

Estimating the distance may involve to predict the distance for the situation when the wind turbine points vertically downwards and is thereby closest to the tower portion. The strain measurement may be performed prior to the "passing time", i.e., the point in time when the rotor blade is vertically pointing downwards and passing the tower portion. For example, the method may involve calculating a deflection of the rotor blade from a reference rotor plane. The deflection may relate to the reflection for a rotor position prior to the "passing rotor position" representing the vertically downwards pointing rotor blade. The calculated deflection may then enable to derive the expected rotor blade tip tower distance, at the passing point in time.

Estimating the distance may comprise to compute the distance using one or more measurement values of a strain of at least one of the rotor blades. The strain of the rotor blade may be measured for example by one or more blade root strain sensor(s). Other embodiments may employ one or more accelerometers mounted at different locations of the wind turbine for providing results of a strain measurement. From the results of the strain measurement, a deformation or deflection of the rotor blade may be calculable, further considering structural properties of the wind turbine blade, such as elasticity, flexibility, stiffness and/or weight of the blade. Estimating the distance may also estimate a tower tilt, i.e., a deviation of the orientation of the longitudinal axis of the tower from a vertical direction.

Strain may be measured on the three blades, for each blade e.g., four sensors may be provided.

Estimating the distance may further consider one or more operational parameters of the wind turbine including also environmental parameters, like wind speed, speed turbulence and/or temperature. The procedure for estimating the distance may in particular consider environmental temperature and/or blade specific temperature, since the temperature may influence the flexibility or stiffness of the rotor blade. In particular estimating and/or measuring the distance may be performed temperature specific.

The estimated and/or measured distances may be stored as historic estimated distance and/or historic measured distance associated with the respective operating conditions and in particular associated with the then prevailing temperature.

For estimating the distance, a particular estimating procedure may have been set up. The estimation procedure may have been set up or developed based on previous training data and/or theoretical considerations including a model of deflection of the rotor blade. The estimation procedure may be defined by a mathematical algorithm having one or more estimation procedure parameters. Correcting the estimation procedure may for example involve to correct one or more estimation procedure parameters, in particular by employing a correction parameter. Correcting the estimation procedure may also be considered to comprise an actual calibration of the estimation procedure based on actual measurements which may be acquired during normal operation of the wind turbine.

For correcting the estimation procedure, the estimated distance and the measured distance may in a combined manner be considered, in particular involving comparing the estimated distance with the measured distance. Thereby, the method may not only rely on a single quantity, i.e., either the estimated distance or the measured distance but may consider both the estimated distance and the measured distance. Thereby, the reliability of the determined distance may be improved, thereby also ensuring safe operation of the wind turbine. In particular, the determined distance may be utilized by a wind turbine controller for controlling the operation of the wind turbine, in order to satisfy one or more requirements regarding e.g. the minimal distance between the rotor blade tip and the tower.

According to an embodiment of the present invention, correcting the estimation procedure comprises at least one of: comparing the estimated distance and the measured distance; forming a difference between the estimated distance and the measured distance; forming a ratio of the estimated distance and the measured distance; calculating at least one correction parameter based on the estimated distance and the measured distance.

Thereby, great flexibility is provided for correcting the estimation procedure. The correction parameter may for example be based on the difference and/or the ratio of the estimated distance and the measured distance. Also, the correction parameter may be associated with the specific rotor blade and/or the corresponding temperature, e.g. ambient temperature or rotor blade temperature. Furthermore, the correction parameter may be specific to the specific rotor blade and/or to the prevailing operating conditions or operating parameters of the wind turbine. The correction parameter may be stored whenever calculated.

According to an embodiment of the present invention, the method further comprises storing at least one correction parameter in an electronic storage as at least one historic correction parameter, in particular associated with the respective temperature; using the historic correction parameter in combination with the actual correction parameter to derive a combined corrected estimation procedure; deriving the corrected distance based on the combined corrected estimation procedure.

When the at least one historic correction parameter is utilized in combination with the actual correction parameter, correcting the estimation procedure may be improved thereby also improving reliability and/or accuracy of the determined distance, in particular the corrected distance. Using one or more historic correction parameters may enable to also apply a statistical analysis of the correction parameters. For example, trends may be identified and potentially extrapolated into the future. Thereby, the method may further be improved.

According to an embodiment of the present invention, the method comprises averaging one or more historic correction parameters and an actual correction parameter, if available, to derive a combined correction parameter, wherein averaging is performed over a time interval and/or for specific yaw angle ranges and/or in a weighted manner.

The combined correction parameter obtained by averaging the one or more historic correction parameters with an actual correction parameter may average out outliers or erroneous measurements or measurement results thereby improving the method. During averaging, correction parameters immediately previously may be weighted higher or lower (as the default) than correction parameters which have been derived at earlier times in the past. In other embodiments, a constant weighting may be applied. When averaging is performed over a specific yaw angle range or one or more specific yaw angle ranges, the dependency of the correction parameter from the specific yaw angle or yaw angle range may be considered or accounted for.

In particular, the correcting the estimation procedure, the calculation of the at least one correction parameter or the calculation of the combined correction parameter may be performed in a yaw angle specific manner, i.e. associated with or specific for a particular yaw angle range. Thereby, the method may further be improved, in particular with regard to a potential tower tilt which may influence the blade tip to tower clearance differently in different yawing positions.

According to an embodiment of the present invention, estimating the distance is performed more often than measuring the distance, wherein when measuring is not available at the actual operating state, in particular for one or more specific yaw position, historic correction information, in particular at least one historic correction parameter, is used for deriving the corrected distance.

Estimating the distance may be performed for every or at least every revolution of the rotor blade, based on continuously acquired strain measurement data, in particular for every individual rotor blade separately. Measuring the distance may be more complex or complicated to be performed for different yawing angles depending on the measurement equipment used for measuring the distance. Some measurement equipment may only enable to measure the distance when the nacelle is in a particular yaw angle or yaw angle range. In this case, the thereby measured distance may be employed also for other yawing ranges. For example, the distance may not be measured for every revolution of the rotor blade. In other embodiments, the distance is estimated as well as measured for every revolution of the rotor blade. Thereby, different kinds of distance measurement equipment or methodology may be supported.

According to an embodiment of the present invention, correcting the estimation procedure is performed temperature specific for different temperatures of the environment and/or the rotor blade, and/or wherein the method is performed individually for every rotor blade of the wind turbine; and/or wherein estimating is performed continuously for every yaw position; and/or wherein estimating the distance is performed based on a strain measurement performed prior to measuring the distance.

Thereby, the temperature dependency of the estimation procedure may be identified or corrected for. When the method is performed individually for every rotor blade of the wind turbine, the particular structural properties, for example regarding stiffness and/or weight, of all rotor blades may be considered at an individual level. Thereby, manufacturing differences of the rotor blades may be accounted for.

According to an embodiment of the present invention, the correction parameter comprises a gain correction, wherein correcting the estimation procedure involves correcting an activation threshold using the gain correction e.g. as follows:

TiptoTowerClearanceControlActivationCorrected-
Threshold=(Measured BTTC)/(Estimated
BTTC)*TiptoTowerClearanceControlActivation-
Threshold Since the uncertainties are linked to each individual blade, a mapping between distance measurement and estimated deflection may be made for each individual blade. Therefore, three equations are required.

Thereby, a particular embodiment is provided, which may be relatively simple to implement. The gain correction may correct a gain utilized in the estimation procedure.

According to an embodiment of the present invention, correcting the estimation procedure involves reducing at least one uncertainty including at least one of: a calibration of the estimation procedure; a sensor accuracy; a sensor sensitivity; a blade weight; a blade structural property, in particular flexibility.

Sensor properties may relate to properties of a measurement sensor and/or a strain measurement. Thereby, the determination of the distance may be more reliable and/or accurate.

According to an embodiment of the present invention, measuring the tip to tower distance uses measuring equipment employing and/or comprising at least one of: Radar, at least one laser attached to tower or any surface of wind turbine.

Thereby, conventionally available measurement equipment may be supported, thereby simplifying the implementation of the method.

According to an embodiment of the present invention, the measurement equipment is configured to measure the distance for one or more different yawing positions of the nacelle harbouring the rotor at which the blades are mounted; and/or wherein the measurement equipment is in particular arranged at the wind turbine tower at a location having highest probability of facing the wind direction.

For example, using a radar system it may be possible to actually measure the distance between the rotor blade tip and the tower for any yaw position/orientation of the nacelle/rotor. In case the measurement equipment is only enabled to measure the distance between the blade tip and the tower at a particular yawing direction, the location of the measurement equipment is selected such that it coincides with the location which to a highest probability faces the wind direction as prevailing at the installation site of the wind turbine. Therefore, it is expected that the measurement equipment provides usable measurement values of the distance for the most of operating time of the wind turbine.

According to an embodiment of the present invention, estimating the tip to tower distance comprises at least one of: measuring a blade root bending strain; measuring or receiving a rotor position; deriving a blade root bending moment in blade flap and/or blade edge direction; deriving an out of plane bending (e.g. OoP) and/or rotor tilt based on stiffness of blade and/or mechanical properties of the blade and/or tower; deriving a total blade deflection and/or blade to tower distance based on stiffness property of the blade and/or mechanical properties of the blade, wherein the estimated distance relates to the distance between the tip of the rotor blade and a portion of the tower, when the blade passes the tower.

Depending on the blade root bending strain and the rotor position, the blade root bending moment may be calculated or derived. Depending on the blade root bending moment, the out of plane bending and/or rotor tilt may be derived further taking into account stiffness properties of the blade and/or other mechanical properties of the blade and/or the turbine tower. The total blade deflection may be calculated based on the out of plane bending and/or rotor tilt. Thereby, conventionally available methods may be employed.

According to an embodiment of the present invention it is also provided a method of controlling a wind turbine, the method comprising: performing a method of determining a distance between a rotor blade tip and a tower of the wind turbine according to an embodiment of the present invention as described above; assessing whether the determined distance is in an allowed range; controlling the wind turbine based on the assessment, in particular changing blade pitch angle to reduce lift, if the determined distance is not in the allowed range.

In other embodiments, at least one airflow regulating device mounted on the rotor blade may be actuated, to reduce deflection of the blade and thereby increase the distance between the blade tip and the tower. The blade pitch angle may also change in the direction, to decrease the deflection of the rotor blade and thereby to increase the distance between the blade tip and the tower. Other control actions may be performed, for example also including supplying one or more reference values to the generator or to a converter coupled to the generator.

It should be understood, that features, individually or in any combination, disclosed, described, explained or provided for a method of determining a distance between a rotor blade tip and a tower of a wind turbine, may also, individually or in any combination, be applied or provided for an arrangement for determining a distance between a rotor blade tip and a tower of a wind turbine according to embodiments of the present invention and vice versa.

According to an embodiment of the present invention it is provided an arrangement for determining a distance between a rotor blade tip and a tower of a wind turbine, the arrangement comprising: a processor configured to estimate the distance based on a strain measurement; to receive a measured distance, to correct an estimation procedure based on the estimated distance and the measured distance, and to derive a corrected distance based on the corrected estimation procedure.

The arrangement may be part or a module of a wind turbine controller. The arrangement may be configured to carry out a method according to an embodiment of the present invention. The arrangement may further be configured to control the wind turbine based on the determined distance.

According to an embodiment of the present invention it is further provided a wind turbine, comprising: at least one rotor blade; a strain sensor mounted to enable measuring root strain of the blade; a distance measurement equipment configured to measure tip to tower distance; and an arrangement according to the preceding embodiment.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Figure 2:
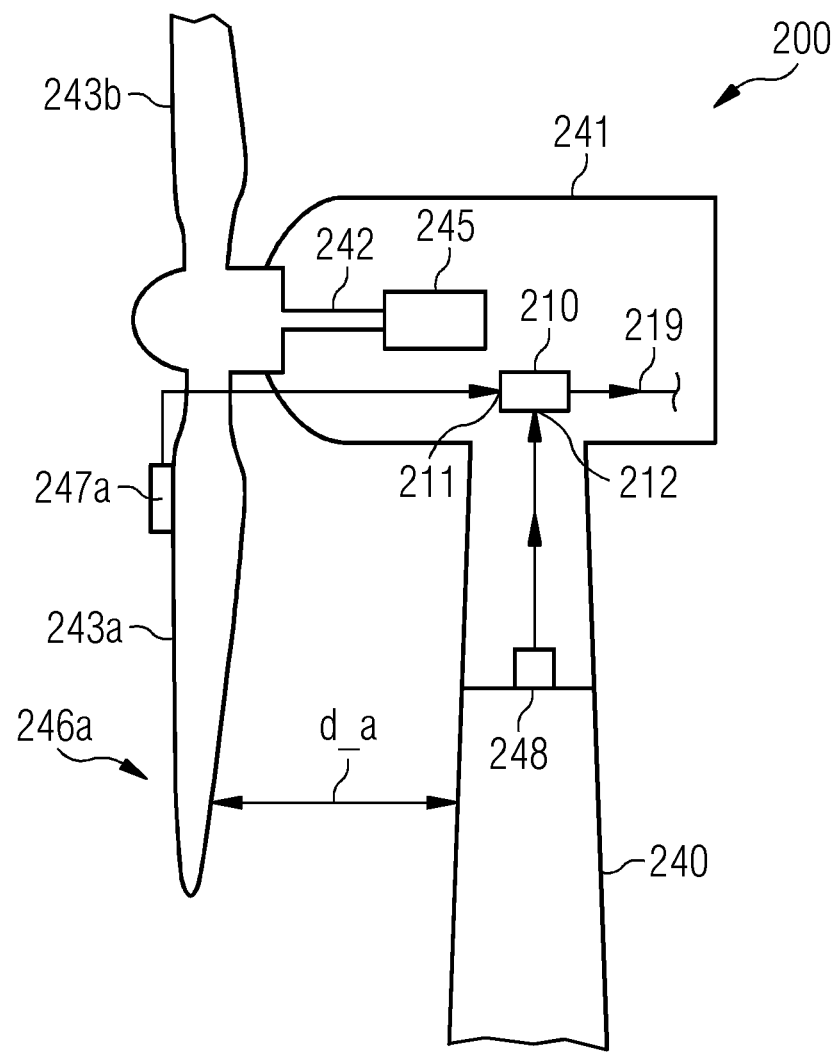
Figure 3:
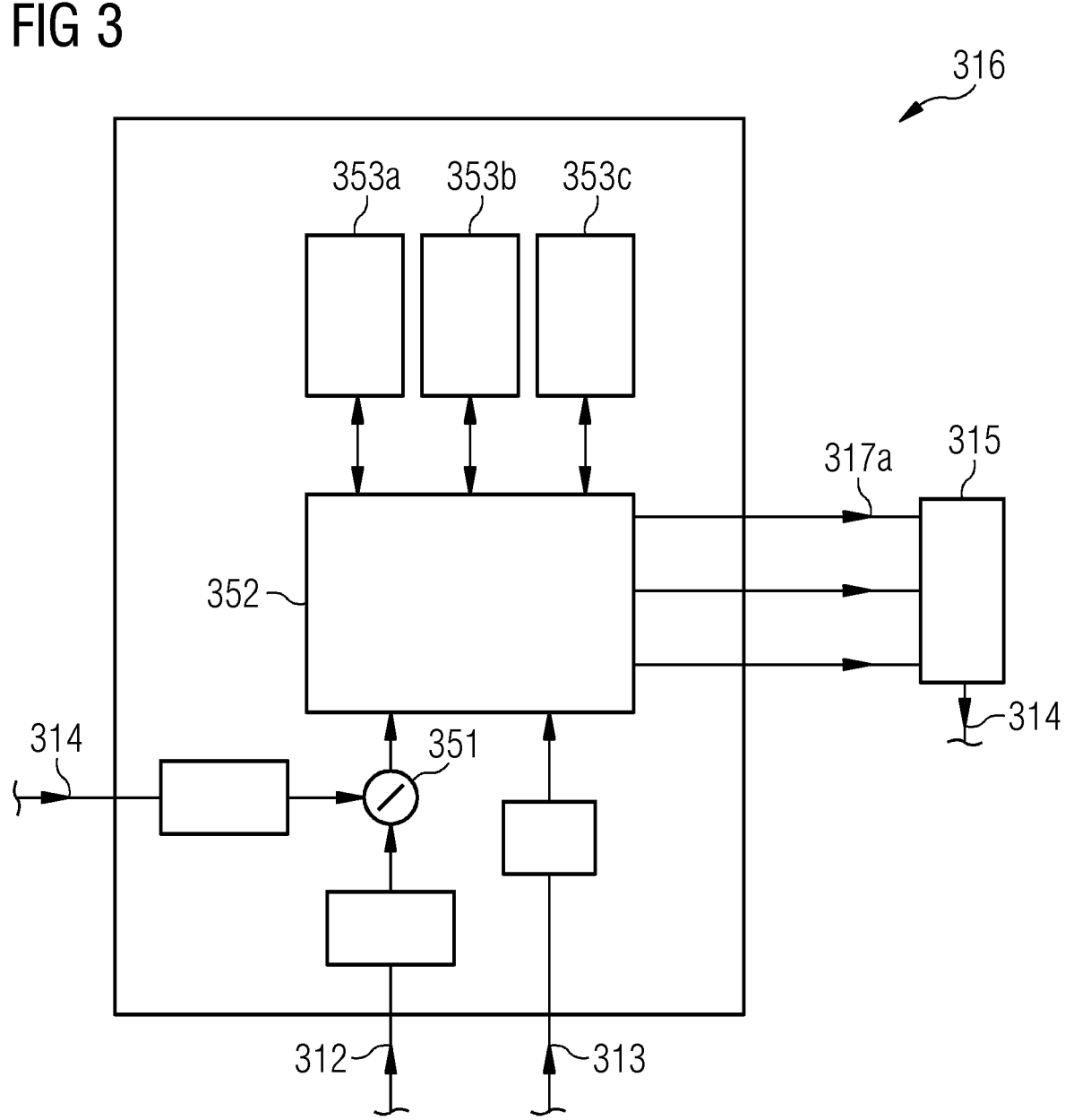

Some of the embodiments will be described in detail, with reference to the following figures, wherein like designations denote like members, wherein:

FIG. 1 schematically illustrates a wind turbine according to an embodiment of the present invention including an arrangement for determining a distance between a rotor blade tip and a tower of the wind turbine, according to an embodiment of the present invention;

FIG. 2 illustrates another embodiment of a wind turbine according to an embodiment of the present invention; and FIG. 3 schematically illustrates a portion of an arrangement for determining a blade tower distance according to an embodiment of the present invention, as may for example be comprised in the wind turbines illustrated in FIG. 1 or 2.

DETAILED DESCRIPTION

The illustration in the drawings is in schematic form. It is noted that in different figures, elements similar or identical in structure and/or function are provided with the same reference signs or with reference signs, which differ only within the first digit. A description of an element not described in one embodiment may be taken from a description of this element with respect to another embodiment.

The wind turbine 100 schematically illustrated in FIG. 1 comprises in wind turbine components 101 at least one rotor blade and a strain sensor mounted to enable measuring root strain of the blade. Furthermore, the wind turbine 100 comprises not in detail illustrated distance measurement equipment configured to measure tip to tower distance. Furthermore, the wind turbine 100 comprises an arrangement 110 for determining a distance between a rotor blade tip and a tower of the wind turbine according to an embodiment of the present invention.

The arrangement 110 comprises a not in detail illustrated processor which is configured to estimate the distance (d, as is for example illustrated in FIG. 2) based on a strain measurement as indicated by strain and/or bending moment measurement data 111. Furthermore, the arrangement 110 is configured to receive a measured distance as represented by measurement signal 112. Furthermore, the arrangement 110 receives the rotor position 113 defining the position of the rotor of the wind turbine components 101.

The estimation module 115 estimates the distance between the rotor blade tip and the tower based on the blade root strain measurement values 111 as well as on the rotor position 113 and outputs the estimated distance or estimated clearance 114. The arrangement 110 is further configured to correct an estimation procedure which is implemented in an estimation module 115 based on the estimated distance 114 and further based on the measured distance 112.

In the illustrated embodiment, the arrangement 110 comprises an estimation evaluation module 116 which receives the estimated distance 114 from the estimation module 115. Furthermore, the estimation evaluation module 116 receives the rotor position 113. Based on the estimated distance 114, the measured distance 112 and the rotor position 113, the estimation evaluation module 116 derives correction parameters 117a, 117b, 117c for the rotor blades A, B, C mounted at the rotor of the wind turbine components 101. The correction parameters 117a,b,c are supplied to the estimation module 115 based on which the estimation module 115 internally derives corrected distances for the different blades which are collectively labelled with reference sign 119. The corrected distance 119 may be utilized in one or more other control modules not illustrated in FIG. 1.

In the illustrated embodiment, the estimation module 115 is further configured to provide pitch angle offset values 120a, 120b, 120c for the different rotor blades A, B, C. The offset pitch angle values 120a,b,c are provided to maintain the individual blade tip tower distances d_a, d_b, d_c within acceptable limits. In other embodiments, the estimation module 115 not necessarily comprises a control functionality to derive the pitch angle offsets 120a,b,c, but may merely determine the corrected distances for the rotor blades collectively labelled with reference sign 119.

The pitch angle offsets 120a,b,c are added to individual pitch reference values 121a,b,c and are provided to the wind turbine components 101 which also comprise a pitch angle actuator for each of the blades. The pitch angle actuator will then set the pitch angle to the sum of the pitch references 121a,b,c and the individual pitch angle offsets 120a,b,c.

The individual pitch angle references 121a,b,c are calculated in the illustrated embodiment by an individual pitch reference calculation module 125 which receives a pitch reference 126 from a speed control module 125. The speed control module 127 receives a rotational speed error 128 which is calculated by a difference element 129 as the difference between a speed reference 130 and an actually measured rotational speed 131 which is measured in the wind turbine components 101.

FIG. 2 schematically illustrates a wind turbine 200 according to an embodiment of the present invention in a schematic structural view. On top of a wind turbine tower 240, a nacelle 241 is mounted. The nacelle harbours a rotor 242 at which plural rotor blades 243a,b are mounted. The rotor drives a generator 245 also harboured within the nacelle 241. Within the nacelle 241, furthermore an arrangement 210 for determining a distance d_a of the rotor blade 243a and the wind turbine tower 240 is arranged. As can be appreciated from FIG. 2, the distance d_a relates to the smallest distance between a tip portion 246a of the rotor blade 243a and a portion of the wind turbine tower 240.

The rotor blade 243a has a strain sensor 247a mounted at a blade root region. The strain sensor 247a acquires strain measurement data 211 which are provided to the arrangement 210. The arrangement 210 outputs a corrected distance 219 which may be utilized by further control or monitoring equipment of the wind turbine 200.

For measurement of the distance d_a, the wind turbine 200 comprises a radar equipment 248 configured to generate measurement signals 212 which are received by the arrangement 210. The corrected distance 219 is determined by the arrangement 210 based on the strain measurement values 211 as well as based on the measured distance 212.

Embodiments of the present invention may combine the stability and prediction benefits of a Coleman based tip to tower clearance estimation function which may for example be implemented in estimation module 115 illustrated in FIG. 1, while removing (at least partly) the uncertainty of the blade root strain measurements, sensor calibration and uncertainty of blade stiffness with an absolute measurement from a tower section (for example distance measurement equipment 248 illustrated in FIG. 2).

As has been mentioned above, the estimation module 115 derives the tip to tower distance based on blade root bending strain measurements, such as measurement values 111 illustrated in FIG. 1 or measurement values 211 illustrated in FIG. 2. The strain measurement values may be converted within the module 115 to a blade root bending moment for all individual blades in the blade flap and blade edge direction, thereby using a calibration strategy using also the blade weight. The blade root bending moment may then be converted, by the module 115, to a rotor collective out of plane bending and rotor tilt. The out of plane bending moments are combined, a total blade deflection may be estimated using the stiffness properties of the individual rotor blades.

If the estimated deflection as well as the measurement data 112 are considered, a corrected estimated distance 119 may be calculated. When the corrected distance 119 is too low, a mitigating pitch action may be executed, e.g. adding a pitch offset to previously derived individual pitch angle references 121$a,b,c$, as is illustrated in FIG. 1.

By combining the estimated distance 114 (calculated based on blade root strain measurements for example) with an actual distance measurement of the tower to the rotor blade, when it passes the tower, certain uncertainties or inaccuracies or unreliabilities observed in conventional methods may be removed or at least mitigated. The distance measurement may link the estimation moment used for the tip to tower clearance controller directly to the actual measured blade to tower clearance. Thereby, uncertainties, for example relating to calibration strategy, sensor measurement quality, blade weight and blade flexibility may be eliminated or at reduced, removing the necessity for additional safety margins.

The distance measurement device, such as measurement equipment 248 illustrated in FIG. 2, may comprise a radar system or a laser equipment being attached to the tower or any other surface of the turbine. The distance measurement values as acquired by the distance measurement equipment 248 may then be compared with the estimated deflection, for example represented by the estimated clearance 114 or estimated distance between blade tip portion and tower.

According to an embodiment of the present invention, a tip to tower clearance controller (TTCC) activation threshold is scaled with the difference between the estimated distance and the measured distance as follows:

TiptoTowerClearanceControlActivationCorrected-
Threshold=(Measured BTTC)/(Estimated
BTTC)*TiptoTowerClearanceControlActivation-
Threshold Since the uncertainties are linked to each individual blade, a mapping between distance measurement and estimated deflection is made for each individual blade. Therefore, three equations are required:

TiptoTowerClearanceControlActivationCorrected-
Threshold_Blade$A$=(Measured BTTC Blade
$A$)/(Estimated BTTC)*TiptoTowerClearance-
ControlActivationThreshold TiptoTowerClearanceControlActivationCorrected-
Threshold_Blade$B$=(Measured BTTC Blade
$B$)/(Estimated BTTC)*TiptoTowerClearance-
ControlActivationThreshold TiptoTowerClearanceControlActivationCorrected-
Threshold_Blade$C$=(Measured BTTC Blade
$C$)/(Estimated BTTC)*TiptoTowerClearance-
ControlActivationThreshold FIG. 1 illustrates the control strategy. The correction of the activation threshold for the individual blades may happen either continuously and the correction may be averaged over time and/or for specific yaw angles where the tip to tower measurement system is placed and/or measurements campaigns where special tip to tower distance measurement equipment is mounted on the turbine. The blade deflection properties and calibration of the sensors may vary over the ambient temperature, so that this correction may need to be continued running at least until all temperatures the sensor is calibrated for are covered. The corrections may be stored in some memory as illustrated in FIG. 3 described below.

Some or all uncertainties may be rotor blade dependent but may not be dependent on environmental conditions (such as turbulence, wind direction, or air density), a distance measurement in a single yaw direction will be sufficient for all other yaw angles. When the distance measurement equipment (for example 248 in FIG. 2) is arranged on the tower in the yaw direction with the highest wind direction likelihood, the highest availability may be combined with the lowest implementation cost. Thereby, a more optimized blade design or a higher allowed tower diameter may be achieved.

As is illustrated in FIG. 1, the speed reference 130 is compared with the measured speed 131 resulting in a speed error 128. The speed error 128 is then supplied to the speed control block 127 which outputs a collective pitch reference 126 as well as a torque reference 150. The collective pitch reference 126 is split up into individual pitch references 121$a,b,c$ for each blade and the pitch angle offsets 120$a,b,c$, are added to provide for the desired rotor blade to tower clearance.

The estimation and controller module 115 may compute the estimated clearance based on the blade root bending moment and rotor position (reference signs 111, 113). Three gain correction signals 117$a,b,c$ are output by the estimation evaluation block 116 and supplied to the estimation and control module 115. From the turbine components 101, the blade to tower distance measurement signals 112 is supplied to the estimation evaluation module 116 which computes the mismatch in gain, i.e. outputs the gain corrections 117$a,b,c$ for the different blades A, B, C.

FIG. 3 schematically illustrates in more detail the estimation evaluation module 316 which may be utilized for example in the embodiment as illustrated in FIG. 1 or 2. The estimated distance 314 as well as the measured distance 312 are received. A division element 351 forms the ratio between the estimated distance 314 and the measured distance 312 and supplies it to a correction handler 352. The correction handler further utilizes the rotor position 313, to evaluate which blade the correction is related to. An actual correction is then combined with the previous stored corrections which are for example stored in memory blocks 353$a$, 353$b$, 353$c$ being e.g. part of the module 316. The combined correction, which is combined to increase the robustness of the correction is then sent to the estimation module 315 via gain correction signals 317$a$, 317$b$, 317$c$. The measured distance 312 may then be stored together with previous measurements in the memory (for example memory blocks 353$a,b,c$) for the respective rotor blades.

Conventional methods may have disadvantages regarding measurement errors, calibration and stiffness uncertainties and so forth. These uncertainties may be compensated for by a more aggressive use of the tip to tower clearance controller, however thereby increasing wear on the pitch system and loss of energy production. Another conventional approach is to measure the distance of the blade to the tower with a radar or laser and use that measurement to predict the required pitch action (to offload the blade) for the next blade passing the tower. But this conventional technique requires observation for full turbine lifetime and for all yaw directions. Furthermore, the measurement system must be reliable for all weather conditions.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of determining a distance between a rotor blade tip and a tower of a wind turbine, the method comprising:
   estimating the distance based on a strain measurement;
   measuring the distance;
   correcting an estimation procedure based on the estimated distance and the measured distance; deriving a corrected distance based on the corrected estimation procedure; and
   changing a blade pitch angle to reduce lift when the corrected distance is not in an allowed range,
   wherein correcting the estimation procedure comprises:
      forming a ratio of the estimated distance and the measured distance; and
      calculating at least one correction parameter based on the ratio.

2. The method according to claim 1, further comprising:
   storing at least one previous correction parameter in an electronic storage as at least one historic correction parameter;
   using the historic correction parameter in combination with the at least one correction parameter to derive a combined corrected estimation procedure;
   deriving the corrected distance based on the combined corrected estimation procedure.

3. The method according to claim 1, comprising:
   averaging one or more historic correction parameter(s) and the at least one correction parameter to derive a combined correction parameter,
   wherein averaging is performed over a time interval and/or for specific yaw angle ranges and/or in a weighted manner.

4. The method according to claim 1,
   wherein estimating the distance is performed more often than measuring the distance,
   wherein when measuring is not available at an actual operating state, historic correction information, is used for deriving the corrected distance.

5. The method according to claim 1,
   wherein correcting the estimation procedure is performed temperature specific for different temperatures of the environment and/or the rotor blade, and/or
   wherein the method is performed individually for every rotor blade of the wind turbine; and/or
   wherein estimating is performed continuously for every yaw position; and/or
   wherein the strain measurement is performed prior to measuring the distance.

6. The method according to claim 1,
   wherein the correction parameter comprises a gain correction,
   wherein correcting the estimation procedure involves correcting an activation threshold using the gain correction.

7. The method according to claim 1, wherein correcting the estimation procedure involves reducing at least one uncertainty including at least one of:
   a calibration of the estimation procedure;
   a sensor accuracy;
   a sensor sensitivity;
   a blade weight;
   a blade structural property, in particular flexibility.

8. The method according to claim 1, wherein measuring the tip to tower distance uses measurement equipment employing and/or comprising:
   radar, and/or
   at least one laser attached to tower or any surface of wind turbine.

9. The method according to claim 1,
   wherein the measurement equipment is configured to measure the distance for one or more different yawing positions of a nacelle harbouring the rotor at which the blades are mounted; and/or
   wherein the measurement equipment is arranged at the tower at a location having highest probability of facing the wind direction.

10. The method according to claim 1, further comprising:
    measuring a blade root bending strain;
    measuring or receiving a rotor position;
    deriving a blade root bending moment in blade flap and/or blade edge direction;
    deriving an out of plane bending and/or rotor tilt based on a stiffness of the blade and/or mechanical properties of the blade and/or tower;
    deriving a total blade deflection and/or the tip to tower distance based on a stiffness property of the blade and/or mechanical properties of the blade,
    wherein the estimated distance relates to the distance between the tip of the rotor blade tip and a portion of the tower, when the blade passes the tower.

11. A method of controlling a wind turbine, the method comprising:
    estimating a distance between a rotor blade tip and a tower of the wind turbine based on a strain measurement;
    measuring the distance;
    correcting an estimation procedure based on the estimated distance and the measured distance, wherein correcting the estimation procedure includes forming a ratio of the estimated distance and the measured distance, and calculating at least one correction parameter based on the ratio of the estimated distance and the measured distance;
    deriving a corrected distance based on the corrected estimation procedure;
    assessing whether the corrected distance is in an allowed range; and
    controlling the wind turbine based on the assessment, including changing a blade pitch angle to reduce lift when the determined distance is not in the allowed range.

12. An arrangement for determining a distance between a rotor blade tip and a tower of a wind turbine, the arrangement comprising:
    a processor configured:
    to estimate the distance based on a strain measurement;

to receive a measured distance;
to correct an estimation procedure based on the estimated distance and the measured distance; to derive a corrected distance based on the corrected estimation procedure; and
to change the blade pitch angle to reduce lift when the corrected distance is not in an allowed range,
wherein correcting the estimation procedure comprises:
  forming a ratio of the estimated distance and the measured distance;
  calculating at least one correction parameter based on the ratio of the estimated distance and the measured distance.

13. A wind turbine, comprising:
at least one rotor blade;
a strain sensor mounted to enable measuring root strain of the blade;
a distance measurement equipment configured to measure blade tip to tower distance; and
the arrangement according to claim 12.

* * * * *